United States Patent [19]

Cairns

[11] Patent Number: 5,084,076
[45] Date of Patent: Jan. 28, 1992

[54] FILTER

[75] Inventor: Frank Cairns, Oadby, England

[73] Assignee: BTR plc, United Kingdom

[21] Appl. No.: 371,050

[22] Filed: Jun. 26, 1989

[30] Foreign Application Priority Data

Jun. 28, 1988 [GB] United Kingdom ............... 8815341
Jun. 28, 1988 [GB] United Kingdom ............... 8815342

[51] Int. Cl.⁵ .............................................. B01D 46/00
[52] U.S. Cl. ............................... 55/304; 55/382;
   55/483; 55/502; 55/486
[58] Field of Search ............... 55/341.1, 483, 500,
   55/508, 486, 487, 521, 502, 524, 522, 304, 382;
   210/484, 496

[56] References Cited

U.S. PATENT DOCUMENTS

| | | | |
|---|---|---|---|
| 2,576,864 | 11/1951 | Valente | 210/491 |
| 2,888,095 | 5/1959 | Perrini et al. | 55/528 |
| 3,422,602 | 1/1969 | Janson | 55/514 |
| 3,479,803 | 11/1969 | Smith | 55/500 |
| 3,622,446 | 11/1971 | Burnham | 55/341.1 |
| 3,774,375 | 11/1973 | Smith | 55/382 |
| 4,178,161 | 12/1979 | Rudner et al. | 55/DIG. 42 |
| 4,213,771 | 7/1980 | Guihet | 55/483 |
| 4,246,061 | 1/1981 | Feldt | 156/474 |
| 4,482,367 | 11/1984 | Howeth | 55/304 |
| 4,787,923 | 11/1988 | Fleigle et al. | 55/304 |

FOREIGN PATENT DOCUMENTS

| | | |
|---|---|---|
| 349493 | 4/1979 | Austria . |
| 0250801 | 1/1988 | European Pat. Off. . |
| 2940712 | 4/1981 | Fed. Rep. of Germany . |
| 83/01582 | 5/1983 | PCT Int'l Appl. . |
| 87/04945 | 8/1987 | PCT Int'l Appl. . |
| 317078 | 12/1929 | United Kingdom . |
| 1192661 | 5/1970 | United Kingdom . |
| 1216350 | 12/1970 | United Kingdom . |
| 1263477 | 2/1972 | United Kingdom . |
| 1295254 | 11/1972 | United Kingdom . |
| 1429253 | 3/1976 | United Kingdom . |
| 2026885 | 2/1980 | United Kingdom . |
| 2036591 | 7/1980 | United Kingdom ............... 55/486 |
| 2064360 | 6/1981 | United Kingdom . |
| 2068433 | 8/1981 | United Kingdom . |
| 2072528 | 10/1981 | United Kingdom . |

OTHER PUBLICATIONS

United Kingdom Search Report, Date of Search 7/9/89,

Primary Examiner—Bernard Nozick
Attorney, Agent, or Firm—Stevens, Davis, Miller & Mosher

[57] ABSTRACT

A filter element for removal of particulate matter from a flow of gas has a plurality of elongate fluid flow passages each defined by porous gas filtration material and arranged as an integral assembly in which the passage lie side-by-side to extend parallel with one another between end regions of the filter element, at least one end of each elongate passage being sealed to prevent free flow of gas to or from the passages, the elongate passages being defined by self-supporting walls of porous gas filtration material and the filter element being substantially rigid or semi-rigid so as to attenuate transverse vibration by no more than 70% between an end of the filter element and a position mid-way between its ends.

14 Claims, 5 Drawing Sheets

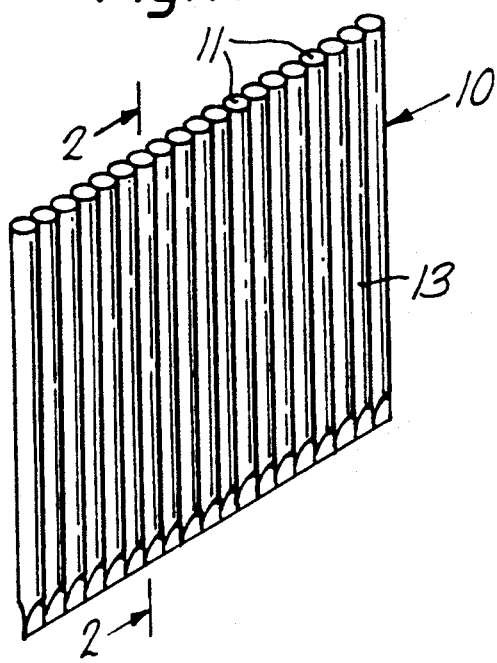
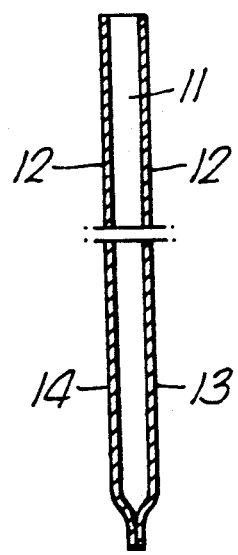
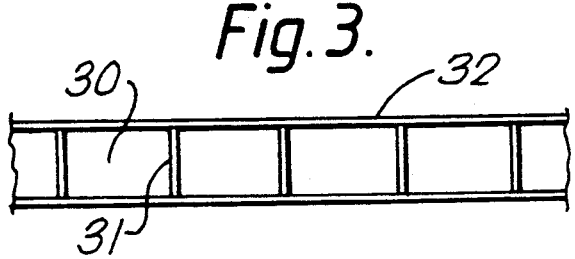
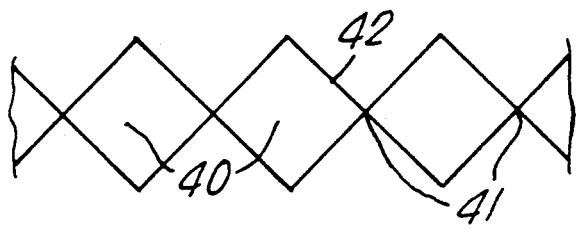
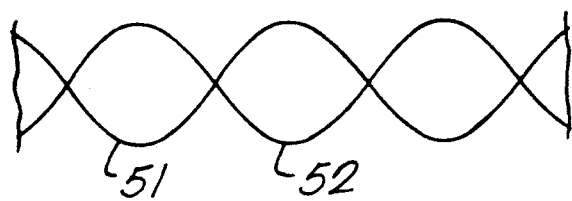

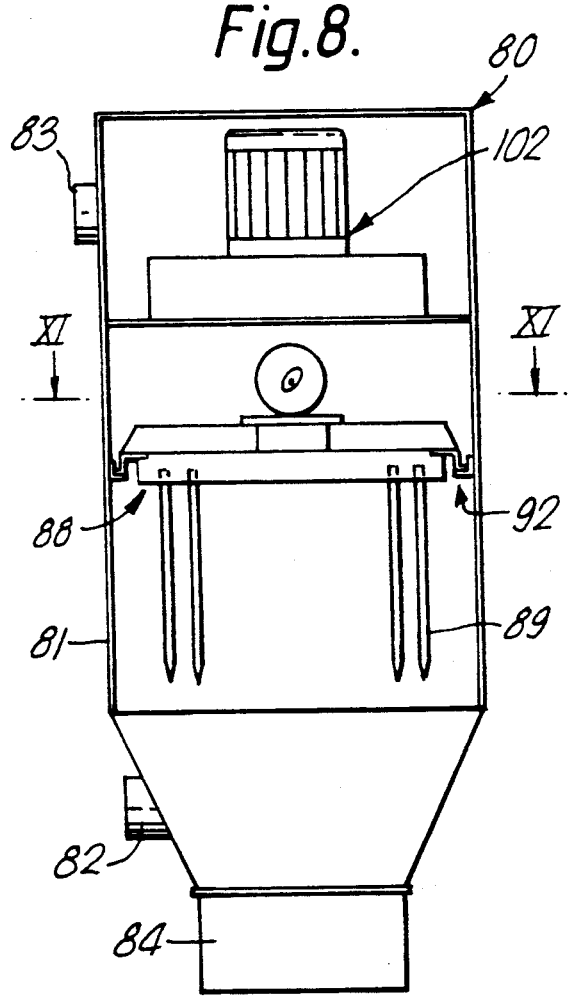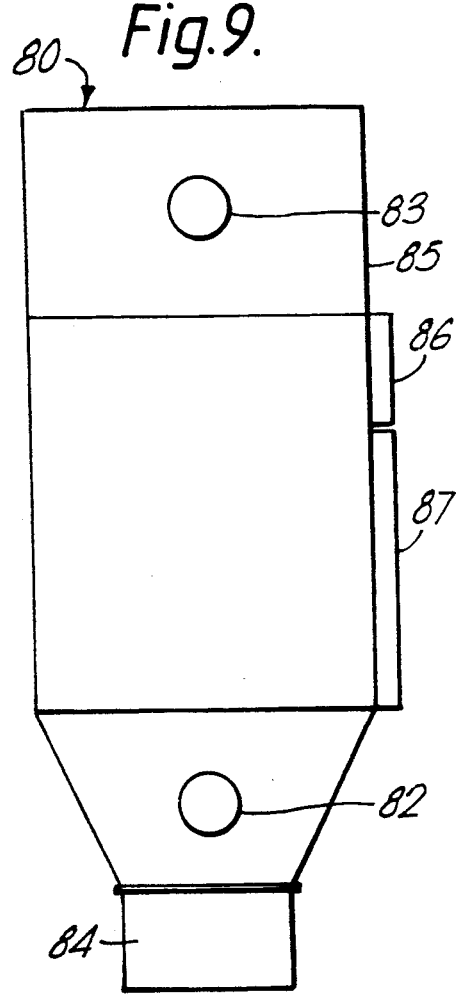

FILTER

This invention relates to a filter element and assembly of a plurality of filter elements and in particular, though not exclusively, to a filter element and filter element assembly for use in an industrial type filter unit of the kind provided with means for the intermittent cleaning or regeneration of a filter element. It provides also a filter unit having said filter elements and means for their intermittent cleaning or regeneration.

In one well established design of an industrial type filter unit a plurality of fabric filter elements are provided in the form of a filter element assembly for attachment to a metal header support frame, and the frame is releasably secured within a filter housing, such as a cabinet or duct, to facilitate its removal for periodic maintenance or replacement of the filter element assembly.

The fabric filter elements may each be of an envelope type shape, i e of relatively flat and rectangular form, and open along only one edge. Commonly a filter element assembly is formed by sewing together or forming integrally a plurality of these envelope type fabric filters such that when the resulting filter assembly is secured to a header frame a plurality of the filter elements hang side-by-side from the header frame with their confronting faces slightly spaced apart for the free flow of gas therebetween. In this arrangement the open edges of the filter elements all lie generally in the plane of the header frame.

For relative ease of removal of dust accumulating at the filter element the direction of gas flow through the filter elements is arranged to be from outside to within each envelope. To prevent collapse of the fabric filters under the differential pressure arising with this direction of gas flow a three-dimensional metal wire mesh insert is provided in each envelope.

Removal of accumulated dust from the exterior surfaces of the filter elements is achieved by periodic vibration of the inserts to shake off the dust. For this purpose the lower, free end of each fabric envelope and its insert engages a respective fork type formation carried by a vibrator bar which extends generally horizontally across the series of elements to a vibrator motor secured to the filter housing.

It will be appreciated therefore that in this well established design of an industrial type filter the metal wire mesh inserts perform two important functions, namely to prevent collapse of the fabric elements and to transmit vibration from the vibrator motor across the fabric surface of each element.

Particularly because the wire mesh insert needs to be of a three-dimensional form in order to maintain a suitable opening within each filter element it is a relatively expensive item. Any means of satisfactorily obviating the need to provide a metal wire mesh insert would be most welcome by manufacturers and users of industrial filter units of this type, and the present invention has as one of its objects the provision of a filter element which facilitates avoidance of the need to provide a metal wire mesh insert or like insert within the filter element.

In accordance with one of its aspects the present invention provides for the removal of particulate matter from a flow of gas a filter element comprising a plurality of elongate fluid flow passages each defined by porous gas filtration material and arranged as an integral assembly in which the passages lie side-by-side to extend parallel with one another between end regions of the filter element, at least one end of each elongate passage being sealed to prevent free flow of gas to or from the passages, the elongate passages being defined by self-supporting walls of said porous gas filtration material and said filter element being substantially rigid or semi-rigid whereby it attenuates transverse vibration by no more than 70% and more preferably by no more than 50% between an end of the filter element and a position mid-way between the ends as considered in the direction of the length of the elongate passages. It is envisaged that the attenuation shall be no more than said 70% or 50% in respect of applied vibrations of 50 c.p.s..

"Transverse vibration" as used herein refers to vibration of an elongate passage in a direction perpendicular to the length of the elongate passage and perpendicular to a plane containing said elongate passage and an adjacent elongate passage.

The invention encompasses within its scope a filter element in which the elongate passages are sealed either at only one or at each end. In the case of passages each sealed at only one end, either the corresponding ends or opposite ends of neighbouring passages may be sealed.

The filter element may be of a kind in which the porous material is self-supporting such that the plurality of elongate fluid flow passages are maintained against collapse even when subject to a pressure differential due to flow of gas from outside the element to within each passage.

In accordance with another of its aspects the present invention provides a filter element assembly wherein a first end region of each of a plurality of filter elements of the invention is embedded in and interconnected by moulded material of a filter element support member whereby said filter elements and support members are in the form of an integral assembly in which tubular passages of each filter element extend in a direction from said support member to a second end region at which they are sealed, the second end region of each element lying remote from the filter element support member and being supported relative thereto solely by the intervening material of the porous element.

For the fabrication of a filter element assembly as defined in the preceding paragraph it is preferred that use is made of filter elements which initially are sealed at each of their ends. A fully sealed construction assists fabrication of a plurality of the elements into a filter element assembly by avoiding the risk of contamination of the elongate passages during moulding of the filter element support member. Subsequent to moulding a first end region of each passage is cut or otherwise adapted to allow flow of gas along the length of the passage and outwards or inwards through the porous material.

The moulded filter element support member may incorporate location means such as a partially embedded rigid frame whereby it is adapted for releasably securing within a gas flow passage to cause a flow of gas to pass through the filter elements associated with the support member.

A filter element in accordance with the subject invention may be intermittently cleaned or regenerated by the conventional technique of reverse flow air pulsation or more typically and preferably by physical vibration.

A filter element and filter element assembly of a plurality of filter elements in accordance with the present invention are considered to be particularly suitable for use in a filter unit of the kind in which a filter element support frame is flexibly mounted relative to a filter housing to permit vibration of the support frame for cleaning of associated filter elements. The moulded support member of a filter element assembly of the present invention may be adapted for securing to or may comprise said support frame.

In accordance with another of its aspects the present invention provides a filter unit comprising a filter housing for containing a flow of gas therethrough, a filter element support frame for the positioning within the filter housing of at least one filter element in accordance with the subject invention, flexible mounting means whereby the support frame may be secured flexibly relative to the housing to permit vibrational movement of the frame relative to the housing and vibration means associated with the support frame for vibration thereof relative to the filter housing.

The vibration means may be a vibration generator, such as an electric motor with an eccentric load, carried directly by the filter element support frame or it may comprise a generator attached for example to the filter housing and having a transmission member operatively connected to the support frame for transmission of vibration thereto. The vibration means may be positioned at a downstream side of the filter unit.

The flexible mounting between the filter element support frame and filter housing may be of a resilient form and may be comprised by one or more elements of elastomeric material. In a preferred embodiment the flexible mounting is comprised by one or more elements of elastomeric material which extend, e g in a peripherally continuous manner, to form a flexible gas tight seal between the filter housing and support frame. Typically the elastomeric material may be bonded to metal surfaces of the filter housing and support frame and the latter may be adapted to slidingly receive and/or releasably secure a filter frame or like auxiliary support frame by which the or each filter element is carried.

Embodiments of the present invention will now be described, by way of example only, with reference to the accompanying diagrammatic drawings in which:

FIG. 1 is a perspective view of a filter element in accordance with the present invention;

FIG. 2 is a section on the line 2—2 of FIG. 1;

FIGS. 3 to 5 are plan views of other filter elements in accordance with the present invention;

FIG. 8 is a front view of a filter unit in accordance with the present invention with access doors removed;

FIG. 9 is a side view of the filter unit of FIG. 8;

Figure 6:
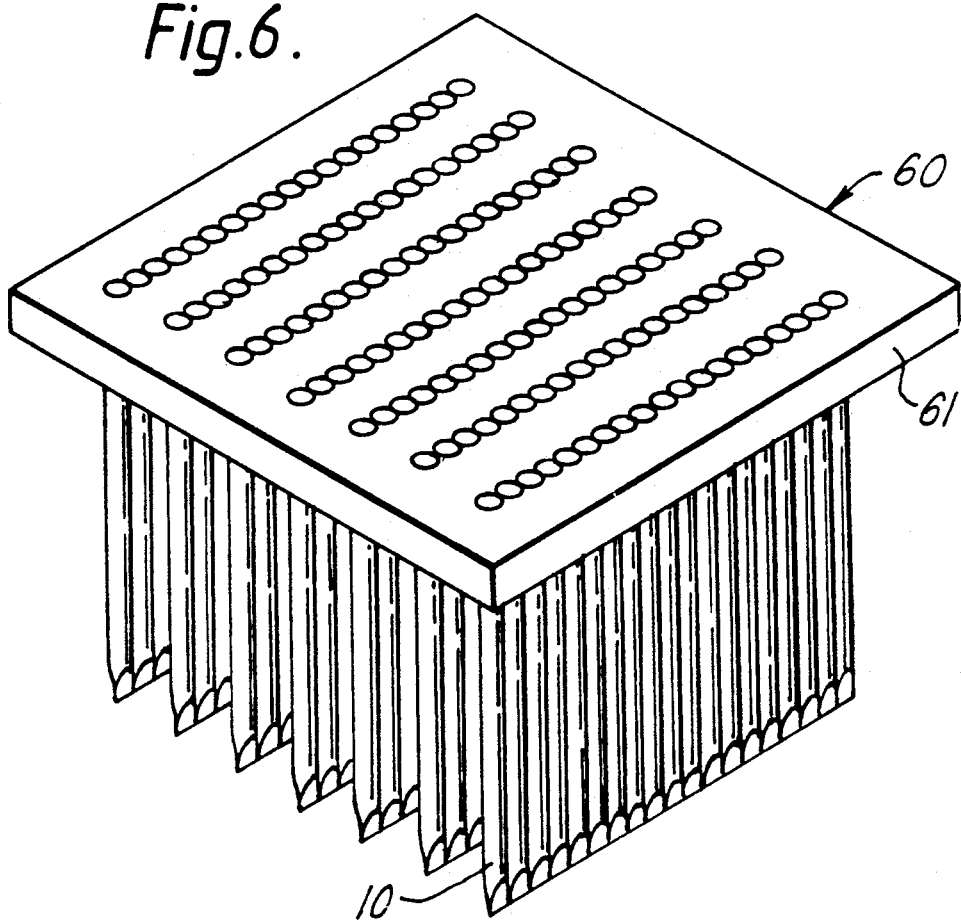
FIG. 6 is a perspective view of a filter element assembly in accordance with the present invention.

A filter element 10 for removal of particulate matter from a flow of air or other gas is of a generally flat form and comprises a plurality of circular cross-section tubular fluid flow passages 11 defined by porous sheet material 12 of the filter element. The fluid flow passages are arranged side-by-side to extend parallel with one another. In this example the element has nineteen tubular passages.

The porous sheet material defining each tubular passage 11 has a substantially uniform wall thickness. Thus each of the main external surfaces 13, 14 of the element is of an essentially corrugated form with each corrugated formation providing communication with a respective tubular passage.

The porous sheet material of the filter element is of a composite construction comprising a 0.6 mm thick layer of porous and flexible polyurethane bonded to and supported by a porous woven support structure. The porous woven structure is a twill weave of polyester filaments having a weft count of 240 per 10 cm and a warp count of 230 per 10 cm. The filter element is constructed by bonding a porous polyurethane fabric to an open-weave support scrim. The scrim may be woven to provide a plurality of adjacent parallel tubes or alternatively two sheets of fabric may be superimposed and laminated by locally heat-sealing or be sewn together to form the multi-tubular structure. The element is provided with a semi-rigid feature either by resin treating the two sheets of scrim fabric before locally heat-sealing to a laminated multi-tubular form or by use of a heat-setting scrim.

The filter element so formed is then subject to an ultrasonic welding operation to close one or each end of each of the tubular passages as required.

The resulting filter element attenuates transverse vibration by no more than 40% between an end of the filter and a position mid-way between the ends as considered in the direction of the length of the passages 11; it is therefore well suited for use in a filter unit of the kind having vibration means for intermittent cleaning of the filter elements.

The filter element need not comprise tubular passages of circular section; it may for example comprise passages 30 of a rectangular section as shown in FIG. 3 and arranged with side portions 31 of successive passages adjoining or passages 40 of a square section as shown in FIG. 4 and arranged with edge portions 41 of successive passages adjoining.

As in respect of the construction of FIGS. 1 and 2, the construction of FIGS. 3 and 4 may be formed by assembling together or integrally forming a plurality of elongate formations each of which defines a tubular passage, or a substantial part thereof, or may be formed by assembling together two sheets 32, 42 of material (with spacer side portions 31 in the case of the FIG. 3 construction) and securing them together for example by heat-sealing or sewing.

Thus the filter element need not be formed from two discrete sheets of material and it may, for example, alternatively be formed from an interwoven support fabric having warp elements 51, 52 laid as shown in FIG. 5 and to which a porous filtration material is subsequently applied.

FIG. 6 shows a filter assembly 60 comprising seven of the aforedescribed filter elements 10 assembled together in integral manner by a moulded ABS (acrylonitrile butadiene styrene) support member 61. The support member has a substantially rigid metal frame (not shown) of channel section material partially moulded therein to assist subsequent location of the filter assembly in a gas flow passage.

The filter assembly may be formed by supporting fully sealed filter elements vertically (with the internal passages extending vertically) in a tray with sealed ends of the elements arranged and held firmly in contact with the base of the tray. The ABS material is then poured into the tray and allowed to solidify and bond to the filter elements. Subsequent to removal from the tray that surface of the moulded assembly which lay on the base of the tray is subject to a machining operation to cut the sealed ends of each passage of each filter element.

Alternatively the filter assembly may be constructed by pre-forming an ABS support member, machining slots in the support member to receive the ends of fully sealed filter elements and then securing the ends of elements in the slots by the use of resin. Subsequently a sealed end of each filter element lying at the support member is cut away.

Figure 7:
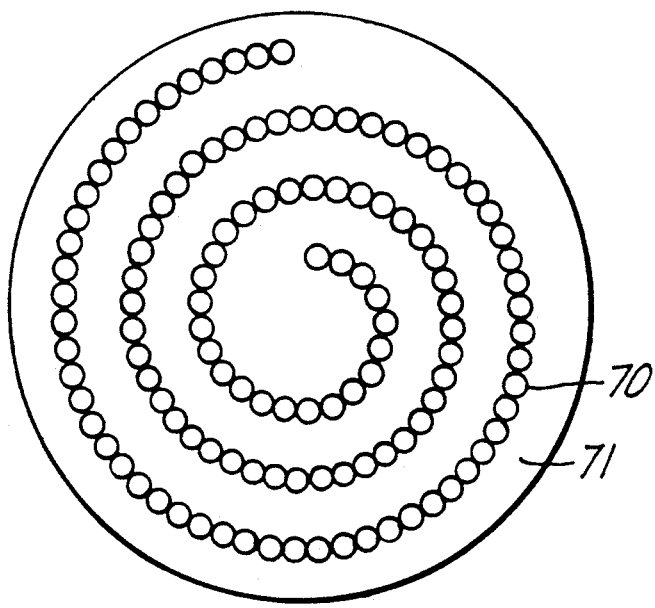
FIG. 7 is a plan view of a filter element assembly in accordance with another aspect of the present invention.

The present invention is not confined to a filter element and a filter element assembly having filter elements of planar form. A filter element may be of a curved form and in particular may be curved about an axis parallel with the length of the tubular passages of the filter element. A filter element assembly may be formed from one or more filter elements of a kind either initially curved or initially planar and then curved for example to a spiral form for embedding in the moulded support member as shown by the element 70 and support member 71 of FIG. 7.

In contrast to the conventional fabric type filter element which the filter element of this invention is intended to replace, the multi-tubular construction of the element generally results in a highly contoured, e g ribbed external surface. This provides an advantageous increase in area of material for filtration as compared with a conventional filter of corresponding overall dimensions.

Referring now to FIGS. 8 to 13, a filter unit 80 of the present invention comprises a sheet metal housing cabinet 81 of rectangular form provided in conventional manner with an air inlet 82 for dust laden air, an air outlet 83 for cleaned air and a collection bin 84 to collect dust removed from filter elements contained in the filter unit during cleaning. The housing 81 has three air tight doors 85, 86 and 87 and FIG. 8 shows the unit with these doors removed.

Figure 10:
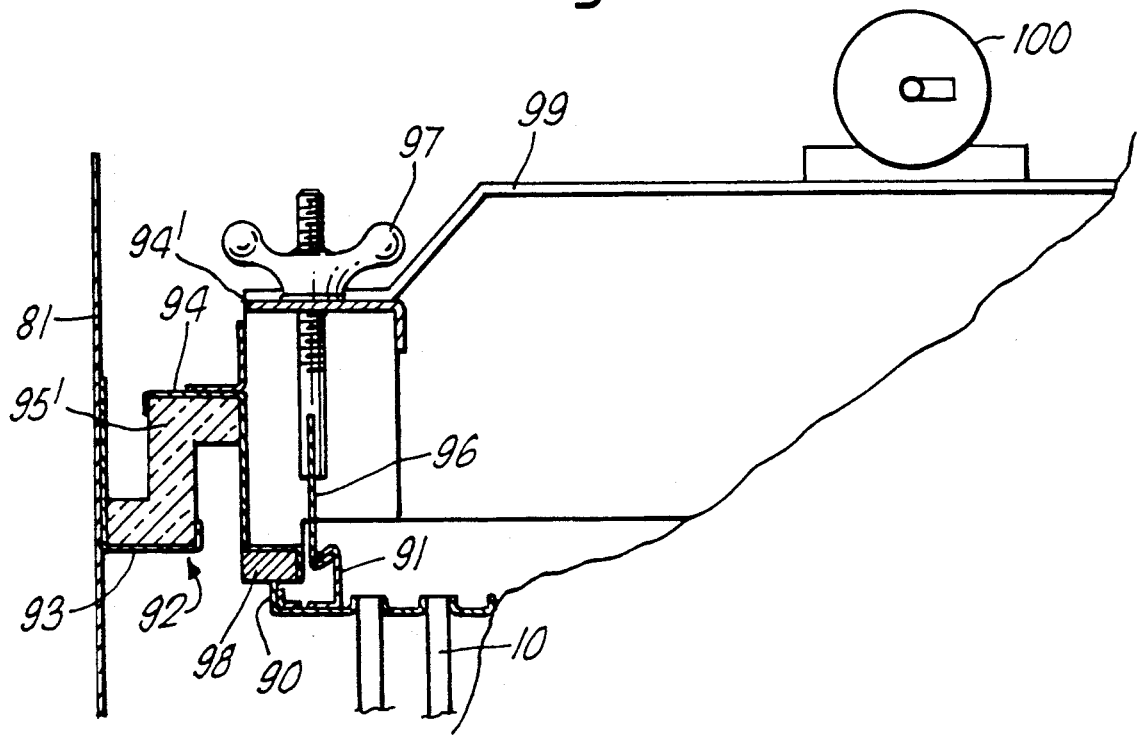
FIG. 10 shows part of FIG. 8 in more detail in section on the line X—X of FIG. 11.
Figure 11:
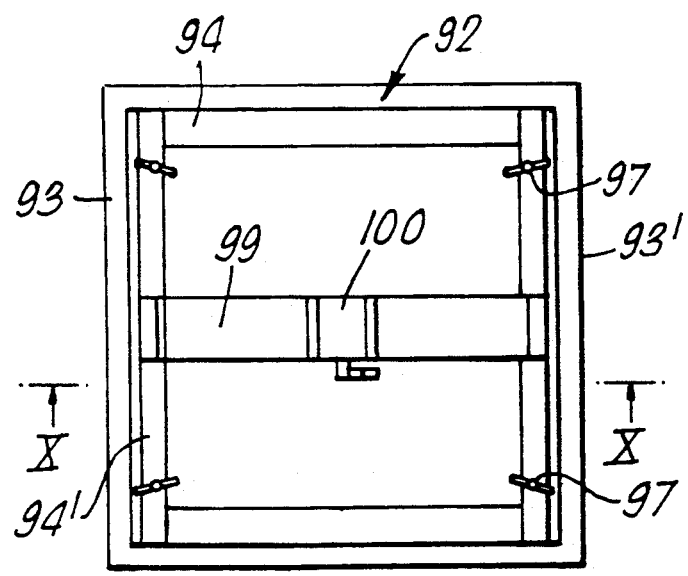
FIG. 11 is a plan view on the line XI—XI of FIG. 8 with a filter assembly removed.

Within the housing 81 there is mounted a filter element assembly 88 comprising a plurality of the aforedescribed envelope type filter elements 10. Only some of the filter elements are shown in FIGS. 8 and 10. An upper end of each element 10 is embedded in and sealed to a vacuum formed ABS filter frame 90. The filter frame 90 has secured to two sides of the periphery thereof a pair of metal strips 91 of substantially C-shape channel section form and which serve as support runners for mounting of the filter element assembly 88 within the filter housing 81.

The front, back and two side walls of the housing 81 have secured thereto a resilient mounting frame 92 of a composite construction. The resilient mounting frame 92 comprises an outer metal frame 93 of angle section welded to a housing wall and an inner metal filter element support frame 94 resiliently secured to the outer frame by an interposed continuous strip 95 of silicone foam bonded therebetween. The frame 94 lies over a horizontally extending limb of the frame 93 as viewed in FIG. 10 such that the silicone foam is loaded substantially only in direct compression by the weight of the filter element assembly 98 when in situ.

Each of the two sides 94' of the inner support frame 94 carries a vertically adjustable runner 96 for co-operation with a respective support runner 91 to allow the filter element assembly 98 to be slid into position or removed from the filter unit as required. Vertical adjustment of each runner 96 is achieved by rotation of a pair of wing-head bolts 97 each supported by an auxiliary inner frame member 94'.

Figure 12:
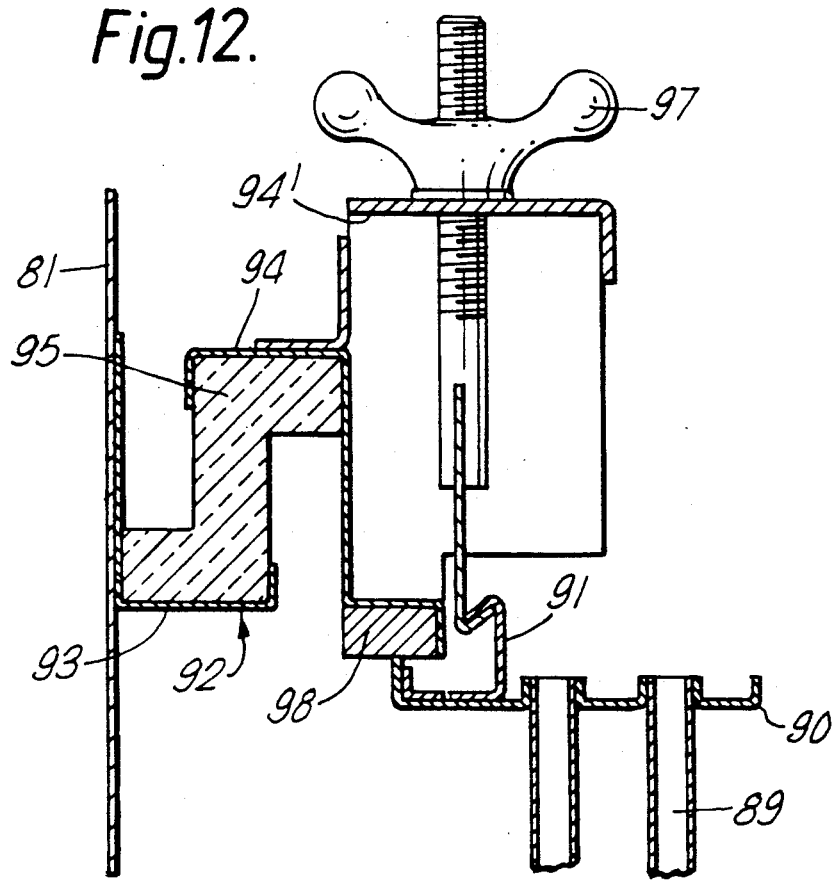
FIG. 12 shows part of FIG. 10 in more detail.
Figure 13:
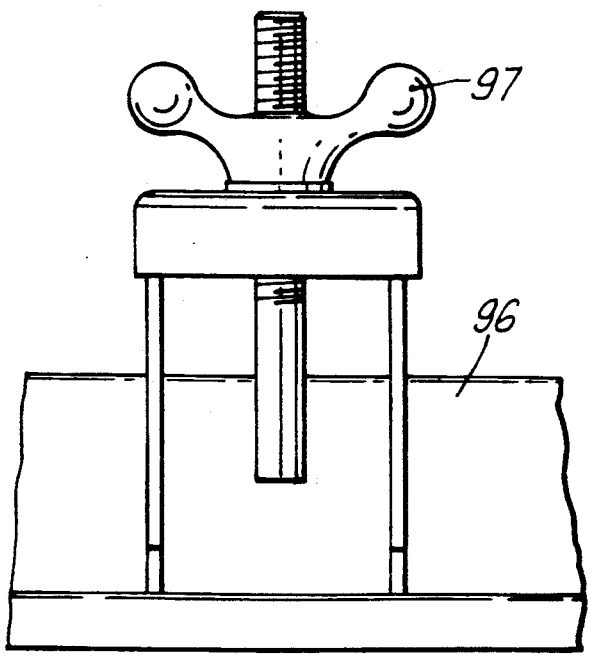
FIG. 13 shows a side view of a retention bolt in situ.

FIGS. 10 and 12 show the left-hand runner 96 in a raised condition and in which the upper edge of the filter frame 90 bears against an air seal 98 carried by the inner frame 94 to prevent the flow of air between the filter frame 90 and the inner support frame 94. When the bolts 97 are rotated to lower the runners 96 the upper edge of the frame 90 moves downwards away from the lower surface of the air seal 98 and when the upper edge of each of the support runners 91 lies below the level of that lower face of the air seal the filter frame 90 may be removed as the lower runners 91 are slid along the upper runners.

The sides 94' of the auxiliary inner support frame 94 additionally support a mounting bridge 99 (see FIG. 10) to the middle of which a vibration motor 100 is secured. The motor has a shaft rotatable at approximately 3,000 rpm and an out of balance weight is secured to that shaft to cause vibration of the filter assembly in use of the filter unit. Typically control and timer means is provided to effect periodic operation of the motor and cleaning of the elements at predetermined intervals of time or at the end of filter operation periods.

A motor and fan unit 102 is provided within the fan housing, downstream of the filter assembly, in a conventional manner to draw air or other gas through the filter unit.

What I claim is:

1. An in situ regenerable filter unit for removal of particulate matter from a flow of gas comprising a filter housing for containing a flow of gas therethrough, a filter element support frame and a plurality of spaced apart filter elements secured in vertical planes to the support frame and arranged to be regenerable by in situ cleaning without removal from the filter housing, each said regenerable filter element comprising a plurality of elongate fluid flow passages each defined by porous gas filtration material through which gas flows to enter a respective passage, said passages extending vertically and being arranged as an integral assembly in which the elongate passages lie side-by-side to extend parallel with one another between end regions of the filter element, the upstream end of each elongate passage being sealed to prevent free flow of gas to or from the elongate passages and the downstream end of each elongate passage being open, the elongate passages being defined by self-supporting walls of said porous gas filtration material that is sufficiently rigid to prevent collapse of the elongate passage when air flows through the wall of the elongate passage to the interior thereof, the passages being defined by two sheets of fabric secured together at longitudinally extending and transversely spaced apart regions thereby to form said plurality of elongate passages, the filter elements comprising a laminate of porous polymeric material bonded to and supported by a porous support scrim, said laminate being substantially rigid or semi-rigid whereby each element attenuates transverse vibration by no more than 70% between an end of the filter element and a position mid-way between the ends as considered in the direction of the length of the elongate passages.

2. An in situ regenerable filter unit according to claim 1 wherein the sheets are secured by sewing.

3. An in situ regenerable filter unit according to claim 1 wherein the two sheets are secured together by heat-sealing.

4. An in situ regenerable filter unit according to claim 3 wherein the element has been rendered substantially rigid or semi-rigid by resin-treating the two sheets prior to heat sealing.

5. An in situ regenerable filter unit according to claim 1 wherein said scrim material is woven.

6. An in situ regenerable filter unit according to claim 1 wherein initially the elongate passages are sealed at each end and have been opened at their end nearest the support frame after being secured to the support frame.

7. An in situ regenerable filter unit according to claim 1 wherein the assembly of passages may be curved about an axis parallel with the length of said passages to define confronting filter element portions which lie spaced apart.

8. An in situ regenerable filter unit according to claim 1 wherein the downstream end of each of said filter elements is embedded in and interconnected by moulded material of a filter element support member whereby said filter elements and support members are in the form of an integral assembly in which the tubular passages of each filter element extend vertically from said support member to said upstream end, the upstream end of each element lying remote from the filter element support member and being supported relative thereto solely by the intervening material of the porous element.

9. An in situ regenerable filter unit according to claim 8 wherein the moulded material of the support member is non-porous.

10. An in situ regenerable filter unit according to claim 8 wherein the moulded support member incorporates location means.

11. Regenerable filter unit according to claim 10 wherein said location means comprises a rigid frame partially embedded in the moulded support member.

12. An in situ regenerable filter unit according to claim 1 and comprising flexible mounting means whereby said support frame may be secured flexibly relative to the housing to permit vibrational movement of said support frame relative to said housing, said flexible mounting means comprising at least one element of resilient material which flexibly interconnects the housing and support frame and provides a gas tight seal therebetween, and vibration means associated with the support frame for vibration thereof relative to the filter housing.

13. An in situ regenerable filter unit according to claim 12 wherein said resilient material is bonded respectively relative to inner and outer members of the support frame.

14. An in situ regenerable filter unit according to claim 12 wherein the filter element support frame has a vibration generator secured relative thereto.

* * * * *